Patented May 13, 1952

2,596,679

UNITED STATES PATENT OFFICE 2,596,679

PROCESS FOR MAKING TETRAPOLYPHOSPHORIC PHOSPHONATES

Hugh J. Hagemeyer, Jr., Kingsport, Tenn., assignor to Eastman Kodak Company, Rochester, N. Y., a corporation of New Jersey No Drawing. Application August 24, 1950, Serial No. 181,319

3 Claims. (Cl. 260—461)

This invention relates to a method for making pesticidal phosphorus compounds in which alkyl phosphonates are reacted with $P_2O_5$ under anhydrous conditions. The invention also relates to pesticidal compositions comprising these phosphorus compounds.

Phosphoric esters have previously been prepared as shown, for instance in U. S. Patents Nos. 2,397,422 and 2,400,577, and in Beilstein, volume IV, pages 595-596. Alkyl phosphonates are ordinarily prepared by reacting triethyl phosphite or some similar ester with an organic halide such as ethyl iodide or propyl bromide. The products resulting from such reactions are employed as the starting material for making pesticidal compounds in accordance with my invention as described herein.

One object of my invention is to provide phosphorus compounds having pesticidal properties. Another object of my invention is to provide a process by which neutral alkyl esters of poly phosphoric phosphonates are produced. A further object of my invention is to provide new phosphorus containing chemical compounds. Other objects of my invention will appear herein.

Alkyl phosphonates are prepared in substantially quantitative yield by reacting an alkyl halide with trialkyl phosphite, for instance, by reacting ethyl iodide and trialkyl phosphite whereby the product diethyl ethyl phosphonate is formed such as in accordance with the following equations:

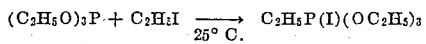
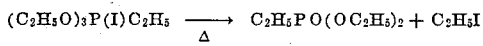

The resulting product diethyl ethyl phosphonate is a clear, colorless, pleasant smelling liquid having a boiling point at 10 mm. of 80–81° C.

I have found that when this product is reacted with phosphorus pentoxide in the ratio of 1–6 mols of the dialkyl alkyl phosphonate to 1 mol of $P_2O_5$ that a product is obtained having maximum insecticidal strength. The products obtained as a result of this reaction vary as regards chemical structure with the proportion of phosphonate and $P_2O_5$ which is reacted together. For instance, if the molar ratio of dialkyl alkyl phosphonate to $P_2O_5$ is 2 to 1, the reaction may be as follows:

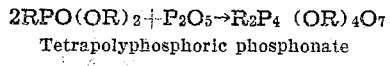

Tetrapolyphosphoric phosphonate

However, using any of the ratios within the range specified herein, products are obtained characterized by a high degree of kill as regards insects and rodents.

The reaction between the $P_2O_5$ and the alkyl phosphonate is suitably carried out in a cooled reaction vessel equipped with an agitator. The dialkyl alkyl phosphonate ester is placed in the reactor with or without an inert solvent for reaction medium and $P_2O_5$ is slowly added to the vessel in the desired amount. For instance, the $P_2O_5$ is added over a period of ten minutes or more or in the alternative the materials are cooled to 0° C. whereupon the $P_2O_5$ can be added at a rapid rate. After the required amount of $P_2O_5$ is added, the mass is agitated and heated at 50–70° C. for one to two hours which is usually sufficient time to effect composition of the reaction. In the case of the lower alkyl compounds ordinarily one-hour treatment is sufficient, whereas with the phosphonate having alkyls or more than two carbon atoms, a longer time is as a rule desirable. The resulting product ordinarily requires no purification but can be employed directly in the preparing of insecticidal compositions. For instance, if a dust is desired the phosphorus compound prepared can be mixed with a carrier such as pyrophyllite or finely divided sulfur in the proportion of 0.5–10% of the phosphorus compound. If the phosphorus compound is to be employed as a spray, it may be dissolved in any inert liquid which is a solvent therefor. For instance, the lower alkyl compounds and the formation of a water solution is readily accompanied for spraying purposes.

Some of the phosphonates which may be employed as a starting material in methods in accordance with my invention are diethyl ethyl phosphonate, diethyl propyl phosphonate, dipropyl ethyl phosphonate, dimethyl ethyl phosphonate, dibutyl methyl phosphonate, dimethyl phenyl phosphonate, etc.

The following examples illustrate the preparation of pesticidal compounds in accordance with my invention and the use of these compounds for insecticidal purposes. In the following examples any of the phosphonates mentioned can be substituted for diethyl ethyl phosphonate.

Example I 142 parts of $P_2O_5$ were added over a period of fifteen minutes to 664 parts of diethyl ethyl phosphonate while thoroughly agitated. After the addition had been completed, a reaction temperature of 50–70° C. was maintained for two hours and the mass was agitated continuously until all of the $P_2O_5$ was reacted. The resulting product which was a neutral ethyl ester of polyphosphonic phosphoric acid was a clear, colorless liquid having a specific gravity of 1.2901, a refractive index of 1.4424 at 20° C., and a decomposition point at 170–180° C. This example may be followed in the reaction of $P_2O_5$ and one of the phosphonates in accordance with my invention using any of the proportions indicated herein.

*Example II*

A dust was prepared with products of Example I with flour, and the effectiveness thereof was tested employing roaches. The concentrations of ester used and the per cent of roaches killed in the times indicated were as follows:

| Percent Ester | Percent Kill | | |
|---|---|---|---|
| | 20 Min. | 1 Hr. | 2 Hrs. |
| 0.5 | 60 | 100 | 100 |
| 0.2 | 40 | 80 | 100 |

All of the phosphorus compounds which may be prepared in accordance with the disclosure herein are characterized by insecticidal properties. When used in the form of dust, it is desirable that the product have a concentration of 0.5–10% in the composition. When used in the form of a spray, concentrations of 0.01–0.5% are usually the most desirable.

I claim:
1. A process of preparing a pesticidal phosphorus compound which comprises reacting under anhydrous conditions a compound having the formula

$$KP(OR)_2 \atop \overset{\displaystyle O}{\|}$$

in which R represents alkyl of 1–4 carbon atoms and K represents lower alkyl and aryl with $P_2O_5$ in the molar ratio of 1–6 parts of the phosphonate to one part of $P_2O_5$.

2. A method of preparing a pesticidal phosphorus compound which comprises reacting a dialkyl alkyl phosphonate the alkyl groups being within the range of 1–4 carbon atoms with $P_2O_5$ in a molar ratio of 1–6 parts of the phosphonate to one part of the $P_2O_5$.

3. A method of preparing a pesticidal phosphorus compound which comprises reacting diethyl ethyl phosphonate with $P_2O_5$ in a molar ratio in 1–6 parts of the former to one part of the latter.

HUGH J. HAGEMEYER, JR.

REFERENCES CITED

The following references are of record in the file of this patent:

UNITED STATES PATENTS

| Number | Name | Date |
|---|---|---|
| 2,397,422 | Kosolapoff | Mar. 26, 1946 |